United States Patent
Tseng

(10) Patent No.: US 8,698,843 B2
(45) Date of Patent: Apr. 15, 2014

(54) RANGE OF FOCUS IN AN AUGMENTED REALITY APPLICATION

(75) Inventor: Erick Tseng, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 12/938,029

(22) Filed: Nov. 2, 2010

(65) Prior Publication Data

US 2012/0105475 A1 May 3, 2012

(51) Int. Cl.
*G09G 5/00* (2006.01)
*G06K 9/00* (2006.01)

(52) U.S. Cl.
USPC ............ 345/633; 345/619; 345/620; 382/106

(58) Field of Classification Search
USPC ........................... 345/633, 619, 620; 382/106
See application file for complete search history.

(56) References Cited

U.S. PATENT DOCUMENTS

| | | | |
|---|---|---|---|
| 4,645,459 A | 2/1987 | Graf et al. | |
| 5,850,531 A * | 12/1998 | Cox et al. | ...................... 715/781 |
| 6,222,937 B1 | 4/2001 | Cohen et al. | |
| 6,266,068 B1 | 7/2001 | Kang et al. | |
| 6,278,461 B1 | 8/2001 | Ellenby et al. | |
| 6,535,210 B1 | 3/2003 | Ellenby et al. | |
| 6,690,370 B2 | 2/2004 | Ellenby et al. | |
| 7,493,153 B2 | 2/2009 | Ahmed et al. | |
| 7,587,276 B2 | 9/2009 | Gold | |
| 7,720,436 B2 | 5/2010 | Hamynen et al. | |
| 2002/0087522 A1 | 7/2002 | MacGregor | |
| 2003/0231190 A1* | 12/2003 | Jawerth et al. | ................. 345/660 |
| 2005/0027705 A1* | 2/2005 | Sadri et al. | ........................ 707/5 |
| 2008/0071559 A1 | 3/2008 | Arrasvuori | |
| 2008/0268876 A1 | 10/2008 | Gelfand et al. | |
| 2009/0005981 A1* | 1/2009 | Forstall et al. | ................. 701/211 |
| 2009/0319181 A1* | 12/2009 | Khosravy et al. | ............. 701/208 |
| 2011/0137561 A1 | 6/2011 | Kankainen | |
| 2011/0141254 A1 | 6/2011 | Roebke et al. | |
| 2011/0161875 A1 | 6/2011 | Kankainen | |
| 2011/0164163 A1 | 7/2011 | Bilbrey et al. | |
| 2012/0194547 A1* | 8/2012 | Johnson et al. | ............... 345/632 |

OTHER PUBLICATIONS

Authorized Officer W. Krynski. International Search Report and Written Opinion in International Application No. PCT/US11/58940, dated Feb. 10, 2012, 10 pages.
Office Action issued in U.S. Appl. No. 13/250,904, filed Dec. 6, 2011, 18 pages.
Office Action issued in U.S. Appl. No. 13/250,904, filed Apr. 12, 2012, 23 pages.

(Continued)

*Primary Examiner* — Kee M Tung
*Assistant Examiner* — Haixia Du
(74) *Attorney, Agent, or Firm* — Fish & Richardson P.C.

(57) ABSTRACT

A computer-implemented augmented reality method includes receiving one or more indications, entered on a mobile computing device by a user of the mobile computing device, of a distance range for determining items to display with an augmented reality application, the distance range representing geographic distance from a base point where the mobile computing device is located. The method also includes selecting, from items in a computer database, one or more items that are located within the distance range from the mobile computing device entered by the user, and providing data for representing labels for the selected one or more items on a visual display of the mobile computing device, the labels corresponding to the selected items, and the items corresponding to geographical features that are within the distance range as measure from the mobile computing device.

24 Claims, 7 Drawing Sheets

(56) References Cited

OTHER PUBLICATIONS

Office Action issued in U.S. Appl. No. 13/250,904, filed Nov. 14, 2012, 6 pages.
Office Action issued in U.S. Appl. No. 13/250,904, filed Apr. 19, 2013, 17 pages.
Julier, Simon et al., "Information Filtering for Mobile Augmented Reality", Jul. 2, 2002, 6 pages.
Rekimoto, Jun, "Matrix: A Realtime Object Identification and Registration Method for Augmented Reality", Proceedings of the 3rd Asia Pacific Computer Human Interaction, 1998, 6 pages.
Rose, Eric et al., "Annotating Real-World Objects Using Augmented Reality", European Computer-Industry Research Center GmbH, 1995, 21 pages.
Office Action issued in U.S. Appl. No. 14/010,598 on Nov. 29, 2013, 30 pages.

* cited by examiner

RANGE OF FOCUS IN AN AUGMENTED REALITY APPLICATION

TECHNICAL FIELD

This document relates to augmented reality applications and setting the information that is provided to a user of such applications.

BACKGROUND

Augmented reality applications allow a user to see a presentation of the world augmented with or superimposed by computer-generated imagery. The imagery may be graphical or textual. The presented world may be presented directly to the user, such as when the user is looking through a display, and the imagery is applied to or projected on the display. The world may also be presented indirectly, such as when a user is navigating previously captured images of the real world, rather than the world that is presently in front of the user.

Augmented reality is now being implemented on mobile computing devices that include digital cameras. In such implementations, the view that is currently being captured by the camera can be displayed as a scene on a screen of the mobile device, and data about items that are shown in the scene may have textual annotations added to them. Non-visible objects may also be represented by annotations. Thus, for example, a user in a city may hold their smart phone in front of them and may be shown the names of restaurants around them. The information may change as a user spins, so that only restaurants that are in front of the user/device are shown. However, it can be difficult to determine precisely where the user is aiming their device, because the camera may simultaneously show multiple items, such as buildings, particularly when the items are at different distances from he user and thus overlap within the device's field of view.

SUMMARY

This document discusses systems and techniques to let a user of an augmented reality system discriminate among items that might be in a field of view of the user's computing device, such as a smart phone. In particular, a graphical control may be provided on a display of the application by which the user can define clipping planes that will be used to filter the items for which information is shown to the user. The clipping planes may indicate a minimum distance under which the user does not want to see items and/or a maximum distance above which the user does not want to see items. Thus, in the interface, a slider may be shown, with an index at its edge that represents various distances from the user in the virtual space of the augmented reality, and selectable sliding controls may be shown on the slider. The user can thus set the relevant distances by dragging the selectable sliding controls to the appropriate point on the slide. As a result, out of all the items that may currently be in front of the user in the virtual space, the user will only be shown information about items that are located between the two specified clipping distances.

In one implementation, the user can set the clipping distance or distances using motion of the computing device. For example, by tipping or flinging the device forward, the user may indicate an intent to have a selectable object slide upward and away from the user, and thus to set the clipping distance farther from the user. In addition, the setting of clipping distances may initially define a ring around the user that is between the selected distances, so that when the distances are set, the relevant items from that ring are retrieved from a distant server system. Only the items in front of the device, in the field of view, will be displayed, and other items will be swapped in as the device turns in a circle. In such a manner, the system can pre-fetch information and quickly update its display as the user moves in a circle.

The details of one or more implementations are set forth in the accompanying drawings and the description below. Other features and advantages will be apparent from the description and drawings, and from the claims.

DETAILED DESCRIPTION

Figure 1:
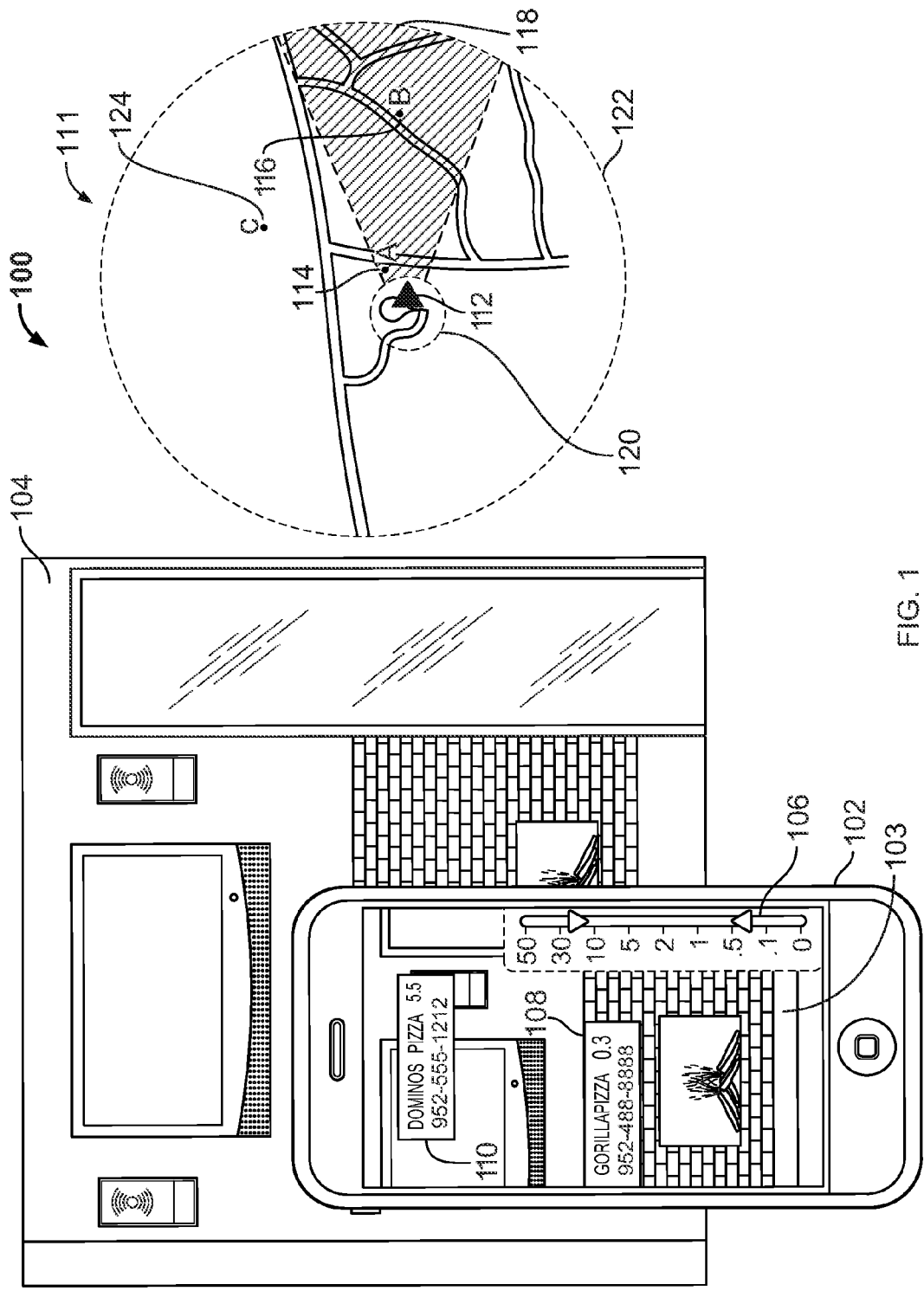
FIG. 1 is a conceptual diagram showing the presentation of items in an augmented reality application in response to user input of clipping distances.

Referring to FIG. 1, in accordance with some implementations, a system 100 includes a mobile device 102. In the example shown, the mobile device 102 is a cellular phone. In other implementations, the mobile device 102 can be a personal digital assistant, a laptop computer, a net book, a camera, a wrist watch, or another type of mobile electronic device. The mobile device 102 includes a camera (not shown) for capturing images and a display screen 103 for displaying graphics, texts, and images. In the example depicted in FIG. 1, the display screen 103 is a touch screen capable of receiving user input. For example, a user contacts the display screen 103 using a finger or stylus in order to select items displayed by the display screen 103, enter text, or control functions of the mobile device 102.

In the example depicted, the mobile device 102 is located within a home, facing a wall 104 of the home. The camera of the mobile device captures images of the wall 104 and displays the images on the display screen 103 in real-time or near real-time. The mobile device 102 includes functionality for determining positional information. For example, the mobile device 102 includes GPS functionality for determining a geographic location of the mobile device 102, a compass for determining a viewing direction of the camera, and an accelerometer for determining a vertical viewing angle of the camera. This information can be used to determine locations that are within the viewing direction and angle of the camera.

In some implementations, positional information (i.e. location, viewing direction, and vertical viewing angle information) is used to identify geo-coded data associated with locations within relative proximity to the mobile device 102. For example, a user of the mobile device 102 enters a text string of "library." The search string, along with positional information obtained by the mobile device 102 can be used to identify libraries that are located within general proximity of the mobile device 102. In some implementations, the mobile device 102 provides a distance control 106 for setting clipping areas. The clipping areas define a range of focus for identifying items of interest. In the example shown, the distance control 106 is presented as a slider that allows the user to select a minimum distance and a maximum distance. For example, a user can set a top slider to 20 miles and a bottom slider to 0.3 miles to indicate that only geo-coded information associated with locations that are greater than 0.3 miles from the mobile device 102 and less than 20 miles from the mobile device 102 should be identified. In other implementations, the distance control 106 can take other forms. For example, the distance control 106 is placed at the top or bottom of the display screen 103. As another example, the distance control 106 includes text fields for the user to manually enter minimum and maximum distance values. As yet another example, the distance control 106 can take the form of a first dial for indicating a minimum distance and a second dial for indicating a maximum distance. In some implementations, the mobile device 102 allows the user to manually set minimum and maximum distances using a map view. For example, a map 111 can be displayed on the display screen 103. The map includes a location icon 112 indicating the current location of the mobile device 102 on the map 111. The user can indicate sizes for a minimum distance bound 120 and a maximum distance bound 122. In some implementations, the user indicates the minimum and maximum distance bounds 120 and 122 by touching the display screen 103. In some implementations, the user can use single or multi-touch functionality of the display screen 103 to drag the minimum and maximum distance bounds 120 and 122 in order to increase or decrease the size of the minimum and maximum distance bounds 120 and 122.

In some implementations, the mobile device 102 allows the user to change the minimum and maximum distance bounds 120 and 122 by moving the mobile device 102. For example, a motion detection unit of the mobile device 102 can allow the user to increase the maximum distance bound 122 by jerking the phone forward or decrease the maximum distance bound 122 by jerking the phone backward. As another example, the mobile device 102 allows the user to increase the minimum distance bound 120 by jerking the phone to the left and decrease the minimum distance bound 120 by jerking the phone to the right. In some implementations, the mobile device 102 allows the user to switch between an augmented reality view as shown in the example on the display screen 103, and a map view. For example, the mobile device 102 provides an icon on the display screen 103. The user selects the icon to switch between the augmented reality view and the map view. As another example, the mobile device 102 allows the user to select a control key, or shake or move the mobile device 102 in a specified manner in order to switch between the augmented reality view and the map view.

In the example shown, the user uses the distance control 106 to specify a minimum distance of 0.3 miles and a maximum distance of 20 miles to use when searching for geo-coded information. These minimum and maximum distances are represented by the minimum and maximum distance bounds 120 and 122 of the map 111. In some implementations, the mobile device 102 accesses a database of geo-coded data stored on the mobile device 102 and identifies all geo-coded data associated with locations that are greater than 0.3 miles from the mobile device 102 and less than 20 miles from the mobile device 102. In other implementations, the mobile device 102 sends positional information (e.g. location and viewing direction) and distance clipping information (e.g. minimum and maximum distances) to a remote computing device, such as a server. In such implementations, the remote computing device identifies geo-coded data that is associated with locations that are greater than 0.3 miles from the mobile device 102 and less than 20 miles from the mobile device 102. Sending the positional and distance clipping information to the remote computing device can lead to a greater number of geo-code pieces of data being identified since the remote computing device may have access to a larger database of geo-coded data. The remote computing device can also perform searches (e.g. web searches) in order to identify addresses or locations that are within the specified ranges.

In some implementations, the mobile device 102 allows the user to enter search strings or otherwise indicate search terms in order to identify geo-coded data. For example, the user can enter a search string of "movies" in order to cause movie theaters and video rental stores within the specified range to be identified. As another example, the user can enter a string of "homes for sale" in order to cause real estate listings within the specified range to be identified. As yet another example, the user can indicate a category of geo-coded data from a list of categories. Categories can include, for example, fast food restaurants, fine dining restaurants, movie theaters, golf courses, airports, banks, ATMs, post offices, night clubs, hair salons, and retail stores. The mobile device 102 or remote computing device then identifies geo-located data that matches the indicated category and is associated with a location within the specified range.

Still referring to FIG. 1, a user of the mobile device 102 sets minimum and maximum distance ranges using the distance control 106. The user further enters in a search string of "Pizza." In this example, the range clipping of which results are returned occurs in two ways. The first type of range clipping is distance clipping. The minimum and maximum distance bounds 120 and 122 indicated by the user are used to exclude geo-coded data associated with locations outside of the bounds. The second type of range clipping is viewing direction clipping. For example, a compass of the mobile device 102 determines a viewing direction within the horizontal plane for the camera of the mobile device 102. The viewing direction is indicated on the map 111 by the location icon 112 which takes the form of an arrow. The viewing direction of the mobile device 102 pans out from the location icon 112 to form a viewing cone. Geo-coded data associated with locations outside of the viewing cone are excluded from the search. The edges of the viewing cone and the minimum and maximum distance bounds 120 and 122 define a clipping area 118. The clipping area 118 defines the geographic area for which geo-coded items are identified. Geo-coded data that is associated with locations outside of the clipping area 118 is excluded. For example, a location 114 and a location 116 are identified as matching the search criteria indicated by the user and being within the clipping area 118. A third location 124 matches the search criteria, but is not within the clipping area 118. The location 124 is therefore excluded from being identified as a desired result for the search.

In some implementations, annotations are generated in association with the identified locations 114 and 116. The annotations are then presented on the display screen 103 over real-time or near real-time images captured by the camera of the mobile device 102 to indicate where the locations 114 and 116 are located in spatial relation to the mobile device 102. For example, an annotating 108 is created for the location 114 to indicate that the location 114 is a restaurant called "Gorilla Pizza" and that the location 114 is located approximately 0.3 miles from the mobile device 102. The annotation additionally displays a phone number for Gorilla Pizza. The annotation is placed on the display screen 103 to represent the general direction of the location 114 to the user. In this example, the location 114 is generally in the leftward portion of the clipping area 118 with respect to the location icon 112 as shown on the map 111. This positional relationship to the mobile device 102 is represented on the display screen 103 by displaying the annotation 108 on the left side of the display screen. In some implementations, the user can select or otherwise indicate the annotation 108 in order to cause the mobile device 102 to place a call to Gorilla Pizza. In some implementations, selecting the annotation 108 causes a landing page (e.g. a web page) associated with the location 114 to appear. For example, a web page for Gorilla Pizza is displayed when the annotation 108 is selected. As another example, the landing page is list of search results using "Gorilla Pizza" as a search term. This can cause a list of restaurant reviews or other articles and listings associated with Gorilla Pizza to be displayed. In some implementations, location information is used to refine the search results displayed. For example, Gorilla Pizza may be a franchised chain restaurant. The search results displayed by the display screen 103 can be refined using the location of the mobile device 102 so that search results that are relevant to this particular location of Gorilla Pizza are displayed.

In some implementations, selecting the annotation 108 will cause directions from the current location of the mobile device 102 to the location 114 to be displayed. In some implementations, selecting the annotation 108 causes additional information about Gorilla pizza, such a menu or address, to be displayed. In some implementations, each annotation displayed by the mobile device 102 is represented as a dot on the display screen 103. Selecting one of the dots can cause a detailed annotation as shown in FIG. 1 to be displayed.

In the example shown, an annotation 110 is created in association with the location 116. The annotation indicates that the location 116 is a restaurant called "Domino's Pizza" and is located approximately 5.5 miles away. The annotation 116 also indicates a phone number for the location 116. The annotation 110 can be selected to cause actions to occur as described above with reference to the annotation 108. The annotation 110 is positioned on the display screen 103 to represent the relative position of the location 116 with relation to the position of the mobile device 102 and the location 114. For example, the annotation 110 is located above the annotation 108 to visually indicate that the location 116 is located further away from the mobile device 102 than the location 114. The annotation 110 is positioned to the right of the annotation 108 to indicate that the location 116 is located to the right of the location 114 with respect to the current position of the mobile device 102.

In some implementations, the annotations 108 and 110 are created by the remote computing device. In such implementations, the remote computing device may further determine where the annotations are to be positioned on the display screen 103 using positional information received from the mobile device 102 and location information associated with each of the locations 114 and 116. The remote computing device then transmits the annotations 108 and 110 and positioning information for the annotations 108 and 110 to the mobile device 102. In some implementations, the annotations 108 and 110 are created by the remote computing device, but the mobile device 102 determines where the annotations are to be positioned on the display screen 103. In some implementations, the remote computing device sends information associated with the location 114 and 116 to the mobile device 102, including information on the geographic locations of the locations 114 and 116. The mobile device 102 then uses this information to create the annotations 108 and 110 and position the annotations 108 and 110 on the display screen 103.

Still referring to FIG. 1, in accordance with various implementations, distance clipping and viewing direction clipping can occur at different times when geo-coded data is being identified. In some implementations, distance clipping and viewing direction clipping are performed by different devices. For example, distance clipping is performed by the remote computing device while viewing direction clipping is performed by the mobile device 102. In some implementations, the remote computing device receives search criteria, positional information and distance clipping information from the mobile device 102. The remote computing device uses the positional information and the distance clipping information to determine the boundaries of the clipping area 118. The remote computing device the uses the search criteria to identifies items of interest that are associated with locations within the clipping area 118. The remote computing device can then identify information associated with the identified items of interest. For example, the remote computing device can identify business names associated with locations within the clipping area 118 that meet the search criteria and use the business names to perform web searches and identify additional information about the businesses. The remote computing device then supplies information associated with the identified items of interest to the mobile device 102. The mobile device 102 displays the received information as annotations on the display screen 103 as described above.

In such implementations, when a user of the mobile device 102 swivels the mobile device 102 and causes the viewing direction of the camera of the mobile device 102 to change, the mobile device 102 sends a new request for items of interest to the remote computing device. The new request for items of interest can include the location and viewing direction of the mobile device 102 as well as minimum and maximum clipping distances and search criteria. The remote computing device then determines a new clipping area for the new viewing direction and identifies items of interest associated with locations within the new clipping area based on the search criteria. The remote computing device supplies information associated with the newly identified items of interest to the mobile device 102 to be displayed as annotations on the display screen 103. In some implementations, a new request for items of interest is sent to the remote computing device when ever the location of the mobile device 102 changes or when the user changes the minimum and maximum clipping distances.

In other implementations, the mobile device 102 provides the remote computing device with search criteria, location information, and values for the minimum and maximum distance bounds 120 and 122, but does not provide viewing direction information to the remote computing device. In such instances, the remote computing device identifies locations that are located between the minimum and maximum distance bounds 120 and 122 that satisfy the specified search criteria, without regard to a viewing direction of the mobile device 102. In other words, the remote computing device performs distance clipping functions but does not perform viewing direction clipping functions. In the example shown, the user of the mobile device 102 has entered a search string of "Pizza." The remote computing device receives indications of the minimum and maximum distance bounds 120 and 122 and the location of the mobile device 102 along with the search string from the mobile device 102. The remote computing device identifies locations 114, 116, and 124 as satisfying the search criteria and being located between the minimum and maximum distance bounds 120 and 122. The remote computing device identifies information associated with the locations 114, 116, and 124 as described above and provides the information to mobile device 102. In some instances, the remote computing device creates annotations using information associated with the locations 1147, 116, and 124 and provides the annotations to the mobile device 102.

In such implementations, the mobile device 102 receives the information associated with the locations 114, 116, and 124 and performs viewing direction clipping to determine which of the locations 114, 116, and 124 are currently within the viewing direction of the mobile device 102. In the example shown, the locations 114 and 116 are within the viewing direction of the mobile device 102. The mobile device 102 therefore displays annotations 108 and 110 associated with the locations 114 and 116 but does not display an annotation associated with the location 124. Implementations in which distance clipping functions are performed by the remote computing device and viewing direction clipping functions are performed by the mobile device 102 can prove beneficial by reducing the number of request for items of interest that are sent to the remote computing device, thereby reducing the total communication traffic between the mobile device 102 and the remote computing device. This is especially true in situations in which a user of the mobile device is more likely to change viewing directions of the mobile device 102 more often than the minimum and maximum clipping distances are changed. For example, the user of the mobile device 102 may slowly rotate in order to view items of interest in every direction. As the viewing direction of the mobile device 102 changes so that the location 124 is within the viewing direction of the mobile device 102, an annotation associated with the location 124 is displayed on the display screen 103. Since the information associated with the location 124 had already been received from the remote computing device, there is no need for the mobile device 102 to send requests for new items of interest to the remote computing device as the mobile device 102 is rotated. The information associated with the location 124 is simply stored locally on the mobile device 102 until the location 124 is within the viewing direction of the mobile device 102, at which time the annotation associated with the location 124 is displayed.

In some implementations, the remote computing device identifies locations of interest that are located within buffer regions located beyond the minimum and maximum distance bounds 120 and 122. For example, the remote computing device defines buffer areas that extend to two miles outside of the maximum distance bound 122 and to up to two miles within the minimum distance bound 120. The remote computing device then identifies locations of interest that match search criteria provided by the mobile device 102 that are located between the minimum and maximum distance bounds 120 and 122 or within one of the buffer areas. The remote computing device provides information associated with the identified locations of interest to the mobile device 102. The mobile device uses the actual minimum and maximum distance bounds specified by the user to identify which of the received locations of interest are located between the minimum and maximum distance bounds 120 and 122, and which received locations of interest are located in the buffer areas. The mobile device 102 then only displays annotations that are located within the bounds specified by the user and in the viewing direction of the mobile device 102. In such implementations, if the user changes location, and therefore causes the mobile device 102 to change location, a location that had previously been located in one of the buffer areas may now be located within the bounds specified by the user. An annotation associated with the location can be displayed on the display screen 103 since the location is now within the bounds specified by the user. This can since the information associated with the location had already been received and stored by the mobile device 102, the change of location of the mobile device 102 does not necessitate that a new request for locations of interest be sent to the remote computing device, until the mobile device 102 travels far enough so that the user defined distance bounds extend beyond the previously established buffer areas.

Still referring to FIG. 1, in the example shown and described above, an augmented reality application running on the mobile device 102 is used to display information about locations within relative proximity to the mobile device 102. In some implementations, the augmented reality application can be used to a reality that is separated from the location of the mobile device 102. For example, a user of the mobile device 102 can indicate a geographic location, for example by typing in an address or selecting a spot on a map. The mobile device 102 can then access a database of street view images that have previously been captured at the indicated location. The user can rotate the mobile device 102 to look at images taken from different viewing directions from the specified location. The user can also move the mobile device 102 in space in order to cause the location represented on the display screen 103 to change.

In some implementations, the augmented reality application displays annotations for locations within relative proximity to the identified location. For example, the user may be planning a trip to Marseille in France. The user can type in the address for the hotel at which he will be staying. The user then uses the distance control 106 to specify a minimum distance bound of 0.0 miles and a maximum distance bound of 1.0 miles. The user enters a search string of "breakfast" in order to identify restaurants that server breakfast that are in walking distance of the hotel. The user can rotate the mobile device 102 to cause annotations associated with locations matching the search and distance criteria to be displayed over street level images taken from the specified location. In this example, the user selects an annotation for a restaurant that serves breakfast and elects to view a map from the hotel to the restaurant. In some implementations, the mobile device 102 communicates with a wireless network printer to allow the user to print the map.

As another example, the user wishes to take a bike ride to a café while staying at the hotel. The user enters a search string of café and uses the distance control 106 to indicate minimum and maximum distance bounds. The user indicates a minimum distance of 5.0 miles to ensure that he gets adequate exercise during the bike ride, and a maximum distance of 7.5 miles to make sure the bike ride isn't too long. The user can then rotate the mobile device 102 as described above in order to cause annotations associated with locations that meet the search and distance criteria overlaid on street level images associated with the location of the hotel to come into view.

Figure 2:
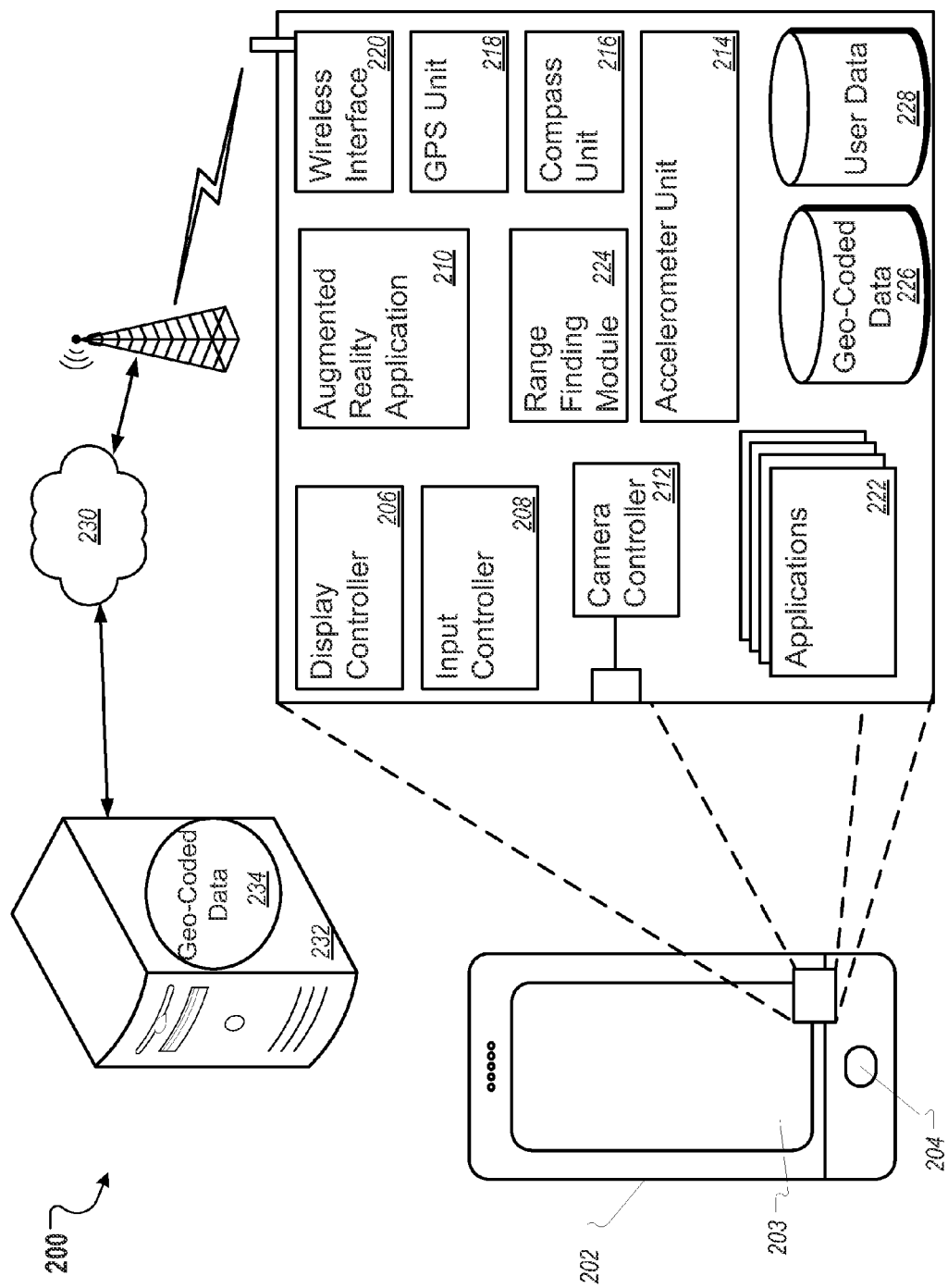
FIG. 2 is a schematic diagram of a system for interacting with a user by way of an augmented reality application on a mobile device.

Referring now to FIG. 2, in accordance with some implementations, a communications system 200 includes a mobile device 202. In the example shown, the mobile device 202 is a cellular phone. In other implementations, the mobile device 202 can be a personal digital assistant, a laptop computer, a net book, a camera, a wrist watch, or another type of mobile electronic device. The mobile device 202 includes a camera (not shown) and a display screen 203 for displaying text, images, and graphics to a user, including images captured by the camera. In some implementations, the display screen 203 is a touch screen for receiving user input. For example, a user contacts the display screen 203 using a finger or stylus in order to select items displayed by the display screen 203, enter text, or control functions of the mobile device 202. The mobile device 202 further includes one or more input keys such as a track ball 204 for receiving user input. For example, the track ball 204 can be used to make selections, return to a home screen, or control functions of the mobile device 202. As another example, the one or more input keys includes a click wheel for scrolling through menus and text.

The mobile device 202 includes a number of modules for controlling functions of the mobile device 202. The modules can be implemented using hardware, software, or a combination of the two. The mobile device 202 includes a display controller 206, which may be responsible for rendering content for presentation on the display screen 203. The display controller 206 may receive graphic-related content from a number of sources and may determine how the content is to be provided to a user. For example, a number of different windows for various applications 222 on the mobile device 202 may need to be displayed, and the display controller 206 may determine which to display, which to hide, and what to display or hide when there is overlap between various graphical objects. The display controller 206 can include various components to provide particular functionality for interacting with displayed components, which may be shared across multiple applications, and may be supplied, for example, by an operating system of the mobile device 202.

An input controller 208 may be responsible for translating commands provided by a user of mobile device 202. For example, such commands may come from a keyboard, from touch screen functionality of the display screen 203, from trackball 204, or from other such sources, including dedicated buttons or soft buttons (e.g., buttons whose functions may change over time, and whose functions may be displayed on areas of the display screen 203 that are adjacent to the particular buttons). The input controller 208 may determine, for example, in what area of the display commands are being received, and thus in what application being shown on the display the commands are intended for. In addition, it may interpret input motions on the touch screen 203 into a common format and pass those interpreted motions (e.g., short press, long press, flicks, and straight-line drags) to the appropriate application. The input controller 208 may also report such inputs to an event manager (not shown) that in turn reports them to the appropriate modules or applications. For example, a user viewing an options menu displayed on the display screen 203 selects one of the options using one of the track ball 204 or touch screen functionality of the mobile device 202. The input controller 208 receives the input and causes the mobile device 202 to perform functions based on the input.

A variety of applications 222 may operate, generally on a common microprocessor, on the mobile device 202. The applications 222 may take a variety of forms, such as mapping applications, e-mail and other messaging applications, image viewing and editing applications, video capture and editing applications, web browser applications, music and video players, and various applications running within a web browser or running extensions of a web browser.

A wireless interface 220 manages communication with a wireless network, which may be a data network that also carries voice communications. The wireless interface 220 may operate in a familiar manner, such as according to the examples discussed below, and may provide for communication by the mobile device 202 with messaging services such as text messaging, e-mail, and telephone voice mail messaging. In addition, the wireless interface 220 may support downloads and uploads of content and computer code over a wireless network.

A camera controller 212 of the mobile device 202 receives image data from the camera and controls functionality of the camera. For example, the camera controller 212 receives image data for one or more images (e.g. stationary pictures or real-time video images) from the camera and provides the image data to the display controller 206. The display controller 206 then displays the one or more images captured by the camera on the display screen 203. As another example, the camera includes physical zoom functionality. In this example, the camera controller 212 receives input from a user via the input controller 208 and causes the camera to zoom in or out based on the user input. As yet another example, the camera controller 212 controls auto focus functionality of the camera.

The mobile device 202 further includes an augmented reality application 210. The augmented reality application 210 displays information and images associated with locations within relative proximity of the mobile device 202. The information and images are displayed as annotations overlaid on top of real-time or pseudo real-time images captured by the camera. For example, a user of the mobile device 202 directs the camera towards a building. The camera controller 212 receives image data from the camera and provides the image data to the display controller 206. The display controller 206 causes the display screen 203 to display images of the building captured by the camera in real-time. The augmented reality application 210 communicates with the display controller 206 to cause information associated with the building to be displayed on or near the real-time images of the building displayed on the display screen 203. In some implementations, information associated with the building includes the name of the building, the address of the building, businesses located within the building, or historical information about the building.

Still referring to FIG. 2, in accordance with some implementations, the augmented reality application 210 uses a GPS Unit 218 of the mobile device 202 to determine the location of the mobile device 202. For example, the GPS Unit 218 receives signals from one or more global positioning satellites. The GPS Unit 218 uses the signals to determine the current location of the mobile device 202. In some implementations, rather than the GPS Unit 218, the mobile device 202 includes a module that determines a location of the mobile device 202 using transmission tower triangulation or another method of location identification. In some implementations, the mobile device 202 uses location information that is determined using the GPS Unit 218 to identify geo-coded information that is associated with the location of the mobile device 202. In such implementations, location information obtained or determined by the GPS Unit 218 is provided to the augmented reality application 210. In some implementations, the augmented reality application 210 uses the location information to identify geo-coded data 226 stored on the mobile device 202.

The geo-coded data 226 includes information associated with particular geographic locations. For example, geo-coded data can include building names, business names and information, historical information, images, video files, and audio files associated with a particular location. As another example, geo-coded data associated with a location of a park may include hours for the park, the name of the park, information on plants located within the park, information on statues located within the park, historical information about the park, and park rules (e.g. "no dogs allowed"). The augmented reality application 210 can use the current location of the mobile device 202 to identify information associated with geographic locations that are in close proximity to the location of the mobile device 202. In some implementations, the geo-coded data 226 is stored on a memory of the mobile device 202, such as a hard drive, flash drive, or SD card. In some implementations, the mobile device 202 may contain no pre-stored geo-coded data. In some implementations, none of the geo-coded data 226 stored on the mobile device 202 is associated with locations within relative proximity to the current location of the mobile device 202.

In some implementations, the augmented reality application 210 uses the wireless interface 220 to obtain geo-coded data from a remote server 232 through a network 230. In such implementations, augmented reality application 210 provides the current location of the mobile device 202 to the wireless interface 220 which in turn transmits the current location to the remote server 232 through the network 230. The remote server 232 accesses a database of geo-coded data 234 and identifies geo-coded data associated with locations within a predetermined proximity of the current location of the mobile device 202. For example, the remote server 232 may identify all geo-coded data 226 that is associated with locations within five miles of the current location of the mobile device 202. The remote server 232 then returns the identified geo-coded data to the mobile device 202 through the network 230.

The augmented reality application 210 utilizes a compass unit 216 of the mobile device 202 to determine a current viewing direction, within the horizontal plane, of the camera. In other words, the compass unit 216 determines a direction in which a user of the mobile device 202 is looking while using the augmented reality application 210. Viewing direction information provided by the compass unit 216 can be used to determine a current viewing scope of the camera. In some implementations, the augmented reality application 210 will provide viewing direction information obtained from the compass unit 216 to the remote server 232 using the wireless interface 220. In such implementations, the remote server 232 uses the viewing direction information to further narrow the amount of geo-coded data 234 identified as relevant geo-coded data. For example, the remote server 232 will identify only geo-coded data that are associated with locations within relative proximity to the current location of the mobile device 202 and within a viewing scope defined by the viewing direction information as being relevant. The remote server 232 then transmits the identified relevant geo-coded data to the mobile device 202.

In other implementations, the remote server 232 does not use viewing direction information to determine relevant geo-coded data. In such implementations, the remote server 232 identifies geo-coded data associated with locations within relative proximity to the mobile device 202. The mobile device 202 then stores the geo-coded data received from the remote server 232 as a portion of the geo-coded data 226. The augmented reality application 210 uses the current viewing direction information provided by the compass unit 216 to identify geo-coded data received from the remote server 232 that is within the current viewing scope of the camera. The augmented reality application 210 uses the identified geo-coded data to create annotations and, in conjunction with the display controller 206, overlays the annotations over real-time or pseudo real-time images captured by the camera and displayed on the display screen 203. The augmented reality application 210 further uses the viewing direction information and the location information to determine positions on the screen where the annotations are to be positioned. For example, the augmented reality application 210 uses geo-coded data to generate several annotations which include business names and descriptions. The annotations are placed over images of the buildings in which the businesses are located within the images captured by the camera.

In some implementations, the mobile device 202 further includes an accelerometer unit 214 for determining a vertical angle of the mobile device 202. In some implementations, vertical angle information generated by the accelerometer unit 214 is provided to the remote server 232 and used to further narrow the geo-coded data that is identified by the remote server 232 and provided to the mobile device 202. In other implementations, the vertical angle information is used by the augmented reality application 210 to identify geo-coded data that is currently within the view of the camera from among a larger set of geo-located data provided by the remote server 232. In some implementations, the augmented reality application 210 uses vertical angle information to more accurately position annotations over images captured by the camera and displayed on the display screen 203.

For example, a user may position the mobile device 202 so that the vertical viewing angle of the camera is generally horizontal. The augmented reality application 210 uses location, viewing direction, and vertical angle information to create annotations and place the annotations over images captured by the camera. Still following this example, the user then changes the vertical angle of the mobile device 202 so that the camera is facing a direction that is 45 degrees above horizontal, without changing the geographic location or horizontal viewing direction of the mobile device 202. The change in vertical angle can cause the augmented reality application 210 to change the position of annotations on the display screen 203 as well as change what annotations are displayed. For example, annotations associated with buildings that are no longer in view after the vertical angle of the mobile device 202 is changed can be removed from the display. As another example, changing the vertical angle may cause additional buildings, such as sky scrapers, to come into view. The augmented reality application 210 can generate annotations based on geo-located data associated with the locations of the buildings and place the newly generated annotations on the display screen 203 over images of the additional buildings.

The mobile device 202 optionally includes a range finding module 224 for determining the distance between the mobile device 202 and buildings or objects depicted in images captured by the camera. For example, the mobile device 202 can include a laser range finder for sending and receiving laser pulses. The laser range finder sends a laser pulse which can reflect off of a building or object. The reflected laser pulse is then received by the laser range finder. The range finding module 224 can control the laser range finder and calculate the amount of time between when the laser pulse is sent and when the reflected laser pulse is received. This time differential can be used to calculate the distance between the mobile device 202 and the building or object off of which the laser pulse is reflected. In some implementations, triangulation, sonar, radar, stadiametric, or coincidence rangefinders can be used to determine distance between the mobile device 202 and buildings or objects within view of the camera.

In some implementations, the augmented reality application 210 uses distance measurements provided by the range finding module 224 along with location, viewing direction, and vertical angle data to more accurately determine which objects and buildings are within the view of the camera. For example, the augmented reality application 210 can use distance measurement information to determine the geographic location of a building within view of the camera, based on the location of the mobile device 202. The augmented reality application 210 can then use the geographic location of the building to request more accurate geo-coded data from the remote server 232 or to better filter geo-coded data received from the remote server 232 to more accurately ensure that only data associated with the location of the building is shown as annotations over the building within images displayed on the display screen 203.

In some implementations, information about buildings, objects, or locations that are not within immediate view of camera are displayed as annotations. For example, the only object within immediate view of the camera may be a brick wall. The augmented reality application 210 generates annotations for businesses, buildings, and locations that are within relative proximity to the mobile device 202 and in the viewing direction of the mobile device 202, but not within the immediate view of the camera. The augmented reality application 210 can cause annotations to be placed on the display screen 203 to indicate the general directions of the locations associated with the annotations. In some implementations, the annotations can include distances to indicate how far away particular businesses or locations are located. For example, an annotation can read "Metro: 0.8 miles" to indicate that a Metro stop is 0.8 miles away in the general direction of where the annotation is located on the screen. As another example, an annotation can read "Schaper Park: 1.1 miles" to indicate that Schaper Park is located 1.1 miles away.

In some implementations, in addition to location or positional data, the augmented reality application 210 can use search terms, key words, or user preferences to identify geo-coded information to display as annotations. For example, a user can enter in a search string or otherwise indicate a search term of "pizza." In some implementations, the augmented reality application 210 supplies the search string along with location and viewing direction data to the remote server 232. The remote server then returns geo-coded data related to pizza places in relative proximity to the mobile device 202 and within the viewing direction of the mobile device 202. In other implementations, the mobile device 202 receives a large set of geo-coded data associated with locations in relative proximity to the mobile device 202. The augmented reality application 210 then uses the search string to identify geo-coded data within the large set of geo-coded data that is associated with pizza places. The augmented reality application 210 can then generate annotations that include information about the pizza places which can be displayed on the display screen 203. A user of the mobile device 202 can then select one of the annotations to bring up additional information about the selected pizza place or to call the pizza place.

Still referring to FIG. 2, in accordance with some implementations, the mobile device 202 includes user data 228. The user data 228 can include user preferences or other information associated with a user of the mobile device 202. For example, the user data 228 can include a list of contacts. Some of the contacts may be associated with addresses. If an address associated with a contact is in relative proximity to the mobile device 202 and within the viewing range of the camera, the augmented reality application 210 can provide an annotation showing information about the contact. For example, the augmented reality application 210 can create an annotation that includes the text "Dave: work" to indicate that the contact "Dave" has a work address within the viewing direction of the camera. Following this argument, the user can select a portion of the annotation displayed on the display screen 203 to bring up information about Dave, call Dave, or to generate a text message or e-mail addressed to Dave.

As another example, user data 228 includes notes or images created by a user and associated with a particular location. For example, the user can use the camera to take a picture. The user than stores the picture on the mobile device 202 and associates the picture with GPS coordinates of where the picture was taken. The augmented reality application 210 can later access the stored picture and display the picture as an annotation when the mobile device 202 is in relative proximity to the location associated with the picture and the location is within the viewing direction of the camera. As another example, the user can write notes about a restaurant. The augmented reality application 210 can later create and display an annotation which includes the notes about the restaurant when the address of the restaurant is within relative proximity to the mobile device 202 and within the viewing direction of the camera.

In some implementations, the user data 228 includes indications of user preferences. For example, historical searching data associated with a user of the mobile device 202 may indicate that the user has an interest in museums and art. In this example, the augmented reality application 210 elects to display geo-coded information related to museums, art galleries, art stores, and public art (i.e. statues, murals, etc.) that are within the viewing range of the mobile device 202 when the user has not indicated a specific search string. As another example, the user data 228 may indicate a historical preference for Italian food. The augmented reality application 210 can create and present annotations associated with Italian restaurants within viewing range of the mobile device 202 when the user has not indicated a specific search string.

Still referring to FIG. 2, in accordance with some implementations, the augmented reality application 210 provides a distance boundary controller to allow a user of the mobile device 202 to set minimum and maximum distance boundaries. For example, the augmented reality application 210 causes the mobile device 202 to display a slider controller on the display screen 203. The user uses the slider controller to set minimum and maximum distance boundaries. The minimum and maximum distance boundaries define an area, with respect to the current position of the mobile device 202, in which locations associated with geo-coded data are to be identified. For example, the user of the mobile device 202 has agreed to meet a friend at a restaurant after work, but has forgotten the name of the restaurant. In this example, the user believes that he will recognize the name of the restaurant if he sees it. The user uses touch screen functionality of the display screen 203 to start the augmented reality application 210. The user knows that the restaurant is an upscale restaurant, is located in a generally northward direction of his current position, and is between a half mile and a mile away. The user sets the distance boundary controller of the augmented reality application 210 to a minimum distance of 0.5 miles and a maximum distance of 1 mile so as to filter out non-relevant hits for restaurants that are too close or too far away. By preventing non-relevant hits from being displayed, the augmented reality application 210 makes it more likely that the user will notice an annotation associated with the desired restaurant location. The user selects a category filter of "fine dining." The user faces in a generally northward direction and rotates the mobile device 202 in order to cause annotations associated with locations that meet the defined distance and category criteria to come into view. As the user rotates the mobile device 202, an annotation for a restaurant called "Solera" appears on the display screen 203. The user recognizes the location as the restaurant that the friend had suggested.

Continuing with this example, the annotation, can include additional information about the restaurant, such as an address, or phone number. Selecting the annotation can cause additional information associated with the restaurant or a landing page associated with the restaurant to appear. For example, in one instance, the user can hail a cab and tell the cab driver to take him to the address indicated by the annotation. The user then selects the annotation to cause a web page for the restaurant to appear. The user can review the menu in order to decide on what to order once he arrives. In another instance, if the user is running late, the user can select the annotation in order to cause the mobile device 202 to place a phone call to the restaurant. The user can tell the person who answers the phone to inform his friend that he is running late. In another instance, the user can start walking towards the general direction of the restaurant as indicated by the annotation as it is displayed over real-time or near real-time images of the user's actual surroundings. In still another instance, the user selects the annotation to cause a map showing directions from the user's current location to the restaurant. The user can elect to view walking directions and follow the directions in order to get to the restaurant.

Still following this example, upon arriving at the restaurant, the user realizes that he is short on cash. The user uses the distance boundary controller to reset the minimum distance to 0.0 miles and the maximum distance to 0.2 miles. The user then indicates a category of "ATM" and rotates the mobile device 202 in order to identify nearby ATMs. Annotations associated with ATMs within 0.2 miles of the mobile device 202 can indicate the banks which own the ATMs and the distance of the ATMs from the mobile device 202. The user identifies an ATM that will not charge him a fee that is indicated as being 500 feet away. The user walks in the direction of the ATM as indicated by the position of an annotation associated with the ATM as displayed on the display screen 203.

As another example, a user of the mobile device 202 moves to a new city and is looking for a job. The user does not own a car and does not live close to a public transit stop. Therefore, the user decides to look for a job within reasonable walking distance of her apartment, but would also like to get exercise when walking to work, so she's interested in finding a job that is at least a half mile away. The user starts the augmented reality application 210 and uses the distance boundary controller to set a minimum distance of 0.5 miles and a maximum distance of 1.5. The user then enters a search string, or otherwise indicates a search for job listings. The user rotates the mobile device 202 in order to cause annotations associated with locations that meet the specified distance and search criteria. In some implementations, the mobile device 202 allows the user to bookmark or store annotations for jobs that sound interesting. The user can also select annotations in order to cause an e-mail addressed to the hiring director for the related job posting to be generated. The user can then send an e-mail expressing her interest in the position to the hiring director. In some instances, if the user does not see any jobs that seem interesting, the user can increase the maximum distance or decrease the minimum distance in order to cause more or different annotations associated with different job postings to be displayed on the display screen 203.

Figure 3:
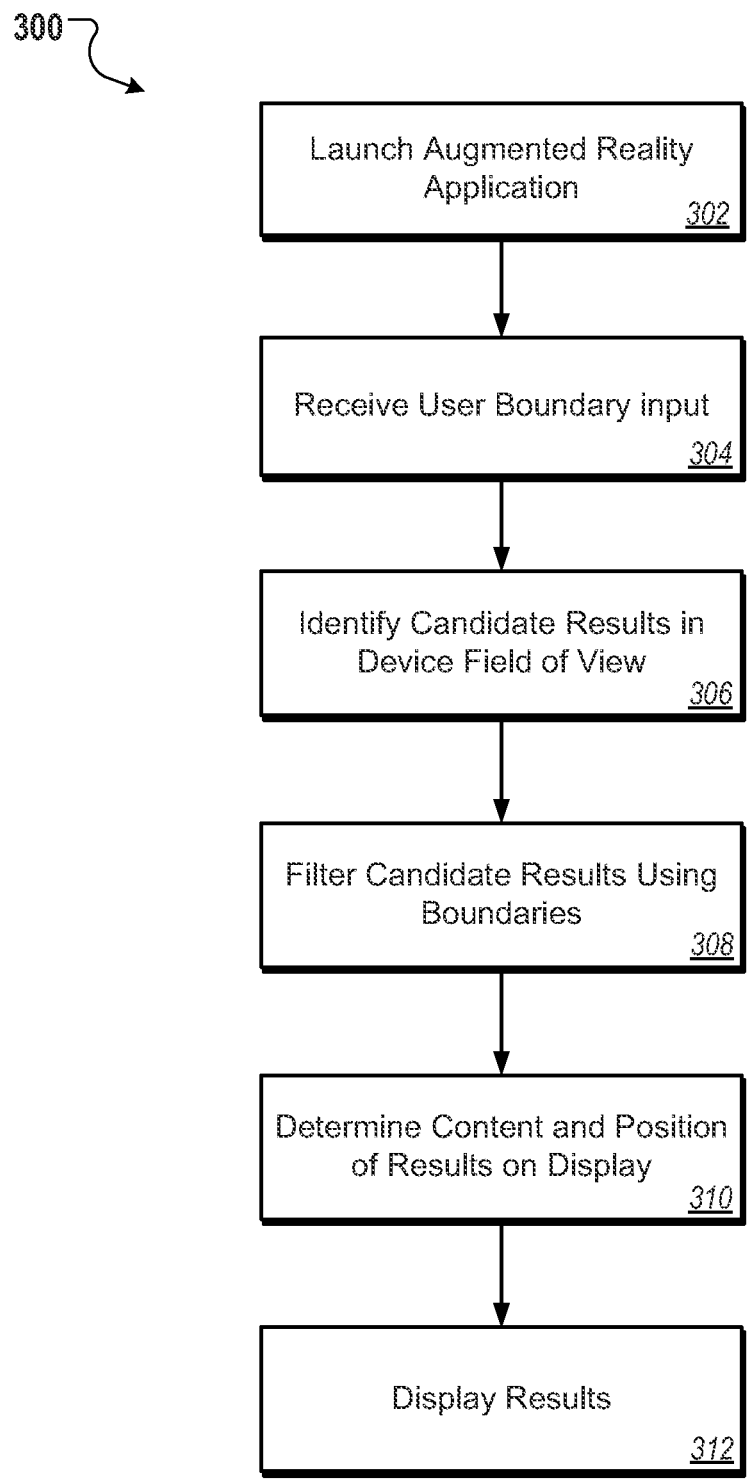
FIG. 3 is a flow chart showing a process for selecting descriptive items that fall within a geographic distance of a user in an augmented reality application.

FIG. 3 shows a flow chart for a process 300 of selecting descriptive items that fall within a geographic distance of a user in an augmented reality application. The process 300 uses minimum and maximum distance boundary values received from a user of a client device to identify geo-coded data items associated with locations that are within the distance boundaries. Annotations are created based on the geo-coded data items and displayed to the user.

Step 302 of the process 300 launches the augmented reality application. For example, referring to FIG. 1, a user of the mobile device 102 can use touch screen functionality of the display screen 103 to scroll through a list of applications and select an augmented reality application. This causes the mobile device 102 to execute the augmented reality application.

Step 304 receives a user boundary input. For example, referring to FIG. 1, the user uses the distance control 106 to indicate a minimum distance boundary of 0.3 miles and a maximum distance boundary of 20 miles. The user adjusts upper and lower icons of the distance control 106 to define maximum and minimum distance boundaries for the clipping area 118. The space between the icons corresponds to the distance between the minimum and maximum distance bounds 120 and 122. As another example, the user sets values for minimum and maximum distance boundaries using one or more text fields. As yet another example, the user enters minimum and maximum distance boundaries using a first dial to indicate a minimum distance and a second dial to indicate a maximum distance. As another example, the user manually sets minimum and maximum distances using a map view. Referring to FIG. 1, a map 111 can be displayed on the display screen 103. The user indicates sizes for the minimum distance bound 120 and the maximum distance bound 122. In some implementations, the user indicates the minimum and maximum distance bounds 120 and 122 by touching the display screen 103. In some implementations, the user uses single or multi-touch functionality of the display screen 103 to drag the minimum and maximum distance bounds 120 and 122 in order to increase or decrease the size of the minimum and maximum distance bounds 120 and 122.

In some implementations, a user changes minimum and maximum distance boundaries by moving client device. For example, a motion detection unit of the client device allows the user to increase a maximum distance bound by twisting the client device in a clockwise direction or decrease the maximum distance bound by twisting the client device in a counter clockwise direction. As another example, the user increases a minimum distance bound a by flicking the client device forward and decreases the minimum distance bound by flicking the client device backward.

Step 306 identifies candidate results in a device field of view. For example, referring to FIG. 2, the mobile device 202 uses the GPS Unit 218 to determine a geographic location of the mobile device 202. The mobile device can also use the compass unit 216 to determine a viewing direction of the camera and the accelerometer unit 214 to determine a vertical viewing angle of the camera. The general device position information generated by one or more of these components can be used to identify geo-coded data from the store of geo-coded data 226 that is associated with locations within a viewing direction of the mobile device 202. In some implementations, the mobile device 202 transmits some or all of the general device position information and the minimum and maximum distance boundary values to the remote server 232. The remote server 232 then uses the general device position information to identify geo-coded data from the store of geo-coded data 234 that is associated with locations within a viewing direction of the mobile device 202. In some implementations, the remote server 232 identifies geo-coded data 234 that is associated with locations within in relative proximity to the mobile device 202. The remove server 232 sends the identified geo-coded data to the mobile device 202 and the augmented reality application 210 running on the mobile device 202 performs the steps of determining which pieces of geo-coded data are associated with locations within the current viewing direction of the mobile device 202.

In some implementations, some geo-coded data is stored at the remote server 232 and other geo-coded data is stored at the mobile device 202. For example, geo-coded information created by a user of the mobile device 202, or associated with the user (e.g. home address, addresses of favorite restaurants, etc.) may be stored on the mobile device 202 as part of the geo-coded data 226 to facilitate ease of access to the geo-coded data. Other, more general geo-coded data, such as business names and locations, may be stored by the remote server 232 as part of the geo-coded data 234. The more general geo-coded data may be stored by the remote server 232 since there is a greater amount of general geo-coded data than user specific data. The more general geo-coded data may also be stored by the remote server 232 because the more general geo-coded data is updated more frequently from various sources than locally stored, user specific geo-coded data.

Step 308 filters candidate results using the user indicated boundaries. For example, referring to FIG. 1, the mobile device 102 receives information associated with locations that are within the viewing direction of the mobile device 102. The mobile device 102 uses the minimum and maximum distance boundary values indicated by the user to identify the minimum and maximum distance bounds 120 and 122 as shown on the map 111. The mobile device 102 then filters out candidate results that are associated with locations within the minimum distance bound 120 or beyond the maximum distance bound 122. In some implementations, the mobile device 102 receives information associated with locations within general proximity to the mobile device 102 in all directions. In such implementations, the mobile device 102 uses viewing direction data and the minimum and maximum distance bounds 120 and 122 to identify the clipping area 118. The mobile device 102 then identifies candidate results that are associated with locations within the clipping area 118.

Step 310 determines the content and position of results on a display of the client device. For example, referring to FIG. 1, the annotation 110 is positioned above the annotation 108 to indicate that the location 116 is located a further distance from the mobile device 102 than the location 114. As another example, the annotation 108 is positioned to the left of the annotation 110 to indicate that the location 114 is positioned to the left of the location 116 with respect to the mobile device 102. In some implementations, semi-transparent, three-dimensional view is overlaid on top of real-time or near real-time images displayed on the display screen. The mobile device 102 can determine where to position annotations or indications of annotations on the display screen 103 in order to indicate spatial relationships between the locations associated with the annotations and the location of the mobile device 102.

Additionally, the mobile device 102 determines content to include in the annotations 108 and 110. In some implementations, each annotation is represented by a dot on the screen. A user selects a dot in order to cause information associated with an identified location to be displayed. In some implementations, each annotation contains basic information about a location, such as a name of the location, a name of one or more business located at the location, a phone number for the location, or an address for the location. In some implementations, selecting an annotation causes additional information to be displayed. In some implementations, selecting an annotation causes a landing page associated with the annotation to be displayed. In some implementations, selecting an annotations causes the mobile device 102 to initiate a telephone call, an e-mail, or a text message. In some implementations, the information included in an annotation is based on user preferences. For example, referring to FIG. 2, the user data 228 stored on the mobile device 202 includes information on annotation display preferences of the user. As one example, the user may indicate that annotations should contain building or business names and no other information. As another example, the user may indicate that annotations are to include a phone number, and a distance away in miles for an associated location. As yet another example, the user may indicate that annotates are to include an indication of customer ratings or reviews for an identified location (e.g. a star rating for restaurants). In some implementations, annotations include notes or text previously entered by the user and associated with a location. In some implementations, annotations include images. For example, an annotation may include an image of a building or a logo associated with a business.

Step 312 displays results. For example, referring to FIG. 1, the annotations 108 and 110 are displayed on the display screen 103. The annotations 108 and 110 are positioned on the screen as determined at step 310 and contain information as determined at step 310. In some implementations, the user can elect to change the presentation of displayed results. For example, the mobile device 102 may allow the user to switch between a map view, a three dimensional landscape view, and an augmented reality view in which annotations are displayed over real-time or near real-time images captured by the camera of the mobile device 102.

In some implementations, the steps of the process 300 can be performed in a different order than that shown. For example, the content of results can be determined before candidate results are filtered using boundaries. As another example, candidate results can be filtered using minimum and maximum distance boundaries before the viewing direction of the client device is used to determine locations within the field of view of the client device.

Figure 4:
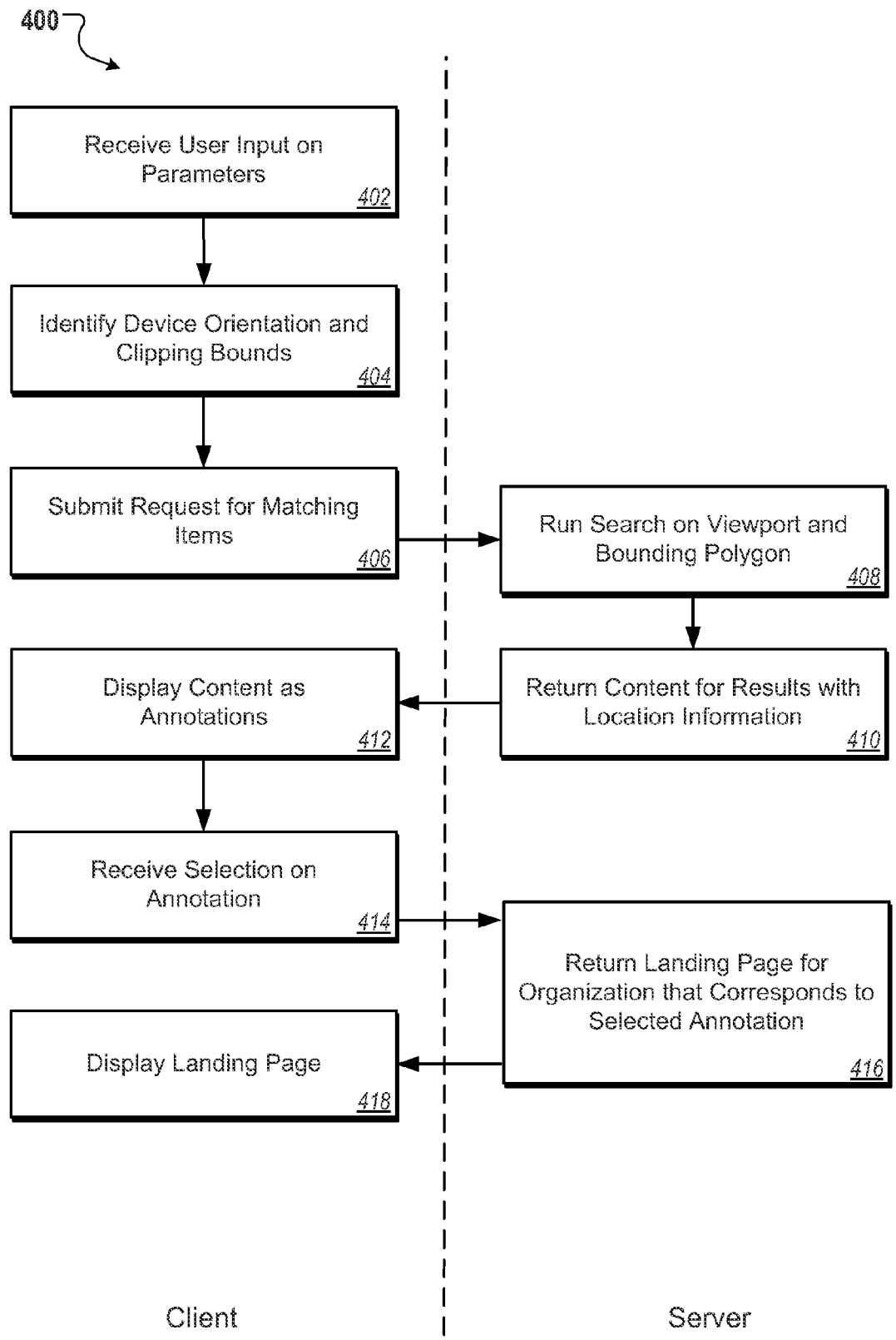
FIG. 4 is a swim lane diagram showing actions performed by an example client and server for controlling the display of augmented reality items.

FIG. 4 is a swim lane diagram 400 showing actions performed by an example client device and server for controlling the display of augmented reality items. Step 402 receives user input on parameters. For example, a user of the client device may enter minimum and maximum distance boundaries for identifying locations within proximity to the client device. As another example, the client device allows the user to specify the width of viewing direction (e.g. panoramic view, regular view, etc.). In some implementations, parameters are entered by the user using a distance boundary controller, such as a slider control, or one or more dial controls. In some implementations, the step of receiving user input parameters includes receiving an indication of search criteria. For example, a user can enter a search string of "car wash" or the user can select a category of "hotels" from a list of categories. In some implementations, the user input is received from the user via input functionality of the client device. In some implementations, some or all of the user input is received from a data base of user information. The data base of user information can be stored locally on the client device or stored remotely on one or more remote servers which can be accessed by the client device. In some implementations, the user input is entered remotely.

Step 404 identifies device orientation and clipping bounds. For example, referring to FIG. 2, the mobile device 202 uses the GPS Unit 218 to determine a geographic location of the mobile device 202. The mobile device uses the compass unit 216 to determine a viewing direction of the camera and the accelerometer unit 214 to determine a vertical viewing angle of the camera. The general device location and orientation information generated by one or more of these components as well as the minimum and maximum distance boundaries identified by the user at step 402 are used to identify a bounding polygon that defines the area within a viewing direction of the camera of the mobile device 202 and in-between the minimum and maximum distance boundaries specified by the user.

Step 406 submits a request for matching items. For example, referring to FIG. 2, the mobile device 202 transmits some or all of the general device location and orientation information and the user specified minimum and maximum distance boundary values to the remote server 232. The mobile device 202 also provides the user specified search criteria to the remote server 232. In some implementations, rather than supplying positional and orientation information to the server, the client device provides an indication of the bounding polygon to the server. The mobile device 202 requests information associated with locations located within the identified bounding polygon that meet the specified search criteria.

Step 408 runs a search on a viewport and bounding polygon. In some implementations, the viewport is the area within the viewing direction of a camera of the client device. The bounding polygon is the region defined by the viewport and the minimum and maximum distance boundaries. In some implementations, the bounding polygon is defined by the client device. In some implementations, the server receives location, viewing direction, and vertical viewing angle information from the client device along with minimum and maximum distance boundary information. In such implementations, the server uses the received information to identify the bounding polygon. The server performs a search to identify geo-coded data associated with locations within the bounding polygon. In some implementations, the server only identifies geo-coded data associated with locations within the bounding polygon that also match search criteria received from the client device. The server can perform searches on geo-coded data stored on the server, or stored on other network devices. For example, upon identifying a location within the bounding polygon, the server performs a web search in order to identify additional information about the location.

Step 410 returns content for results with location information. For example, referring to FIG. 1, the server identifies the locations 114 and 116 as being within the clipping area 118 (i.e., the bounding polygon) and as matching search criteria specified by the user of the mobile device 102. The server identifies information associated with the location 114 and 116, for example, by performing web searches or by accessing one or more stores of geo-coded data to identify pieces of geo-coded data associated with the locations 114 and 116. The server then provides details of the locations 114 and 116 (e.g. addresses, latitude and longitude coordinates, etc.) along with associated information to the mobile device 102.

Step 412 displays content as annotations. In some implementations, the server creates the annotations using the information and provides the annotations to the client device. In some such implementations, the server also determines where the annotations are to be placed on a display screen of the client device. In some implementations, the annotations are created by the client device and placement of the annotations is determined by the client device. The annotations are then displayed on the display screen of the client device. For example, referring to FIG. 1, the annotations 108 and 110 are displayed on the display screen 103 in order to convey information associated with the locations 114 and 116. The placement of the annotations 108 and 110 on the display screen 103 corresponds to the geographic relationship between the location of the mobile device 102 and the locations 114 and 116.

Step 414 receives a selection on an annotation. For example, the client device may have touch screen functionality and the user selects an annotation using a stylus or by pressing a finger on the screen. As another example, a user uses a track ball of the client device to select an annotation. The client device informs the server of the selection. In some implementations, the client device informs a different, second server that an annotation has been selected and requests information associated with the annotation from the different, second server.

Step 416 returns a landing page for an organization that corresponds to the selected annotation. For example, if the annotation is associated with a restaurant, the server returns a web page for the restaurant that includes information on the restaurant, such as hours of operation and a menu. As another example, selecting an annotation associated with a restaurant causes the server to return a landing page listing reviews of the restaurant posted by restaurant reviewers or other users. As another example, selecting an annotation associated with Soldier Field may cause the server to return the website for the Chicago Bears, or a landing page listing upcoming events occurring at Soldier Field.

Step 418 displays the landing page. In some implementations, the server provides the landing page to the client device and the client device displays the landing page. In some implementations, the server provides a URL for the landing page and the client device uses the URL to request the landing page from a different server. The client device then displays the landing page. In some implementations, the client device allows the user to switch between the landing page, and an augmented reality view by, for example, selecting an icon or pressing a control key.

Figure 5:
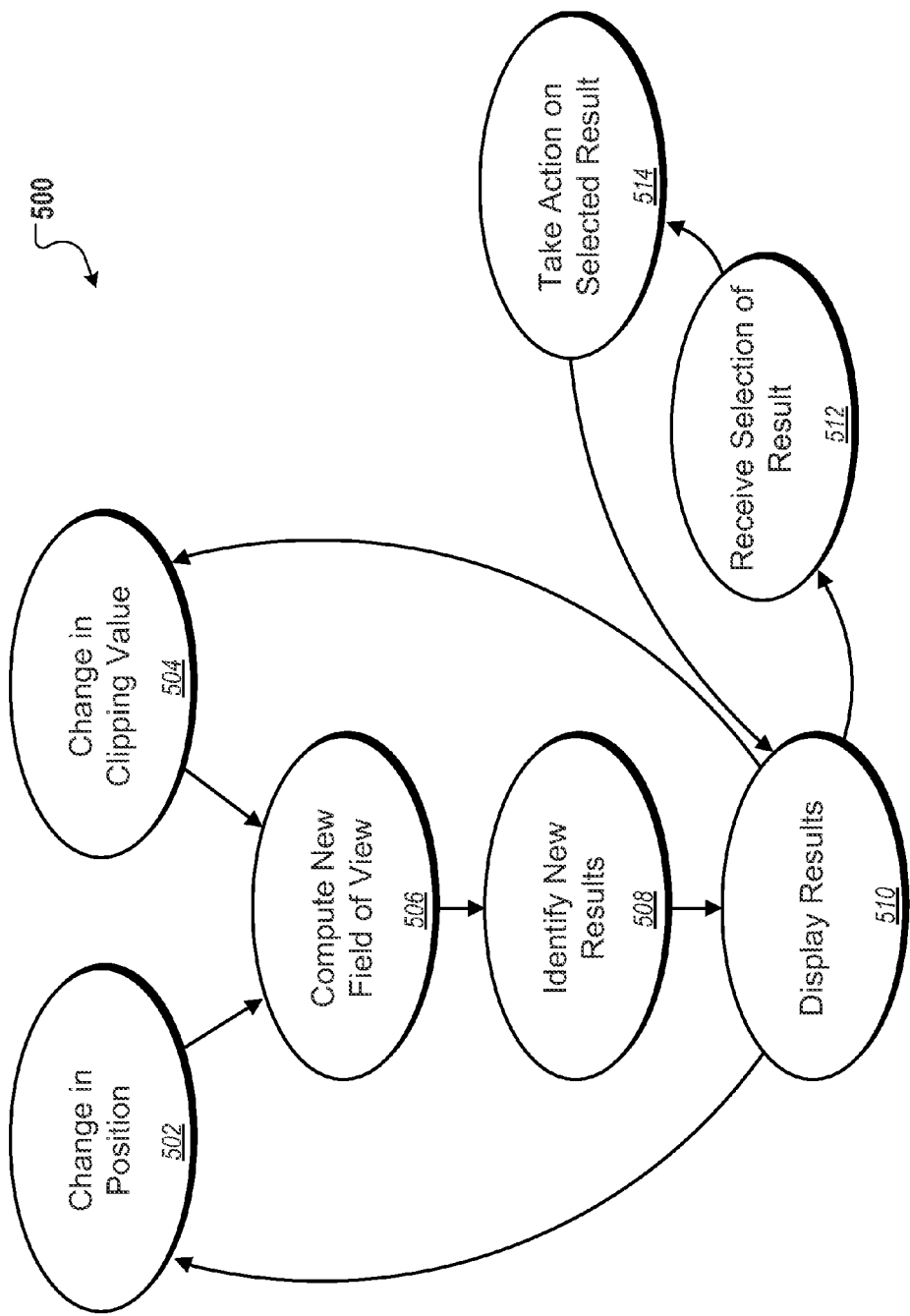
FIG. 5 is a flow diagram of actions taken in an augmented reality system.

FIG. 5 is a flow diagram 500 of actions taken in an augmented reality system. At stage 502, a change in position occurs. The change in position can encompass a change in geographic location, a change in viewing direction, a change in a vertical viewing angle, or a change in any combination of these parameters. For example, a user with a mobile device running an augmented reality application is walking down a city street, thus causing the position of the mobile device to change. As the user moves, the orientation of the mobile device (i.e. viewing direction within the horizontal plane and vertical viewing angle) may remain the same or the orientation may also change.

At stage 504, a change in clipping value occurs. For example, referring to FIG. 1, a user of the mobile device 102 changes the clipping values by moving icons on the distance control 106 to define the minimum and maximum distance bounds 120 and 122. In some implementations, a change in clipping value occurs in conjunction with a change in position. In some implementations, a change in clipping value occurs while the position of the client device remains unchanged.

At stage 506, a new field of view is computed. For example, in response to a change in position, a change in clipping value, or both, the area of interest for the client device changes. For example, referring to FIG. 1, reducing the maximum distance bound 122 will cause the clipping area 118 to change, which will change the area of interest for geo-coded information. As another example, rotating the mobile device 102 will cause the clipping area 118 to rotate about the location icon 112. Changing the shape or position of the clipping area 118 will cause new items of interest to come into the scope of the view of the mobile device 102. After a change in clipping values or a change in position, the client device calculates a new bounding polygon based on the new clipping values or the new positional data associated with the client device.

At stage 508, new results are identified. For example, referring to FIG. 1, if the mobile device 102 is rotated to the left, the clipping area 118 will shift counter clockwise with relation to the location icon 112. This may cause the location 124 to be positioned in the new position of the clipping area 118. The location 124 can be identified as a new result. As another example, when the bounding polygon is moved or resized, a new search is performed to identify items that match user specified search criteria and are associated with locations within the new bounding polygon. In some implementations, additional information associated with the identified items is identified (e.g. by performing database or web searching)

At stage 510, results are displayed. For example, annotations are created based on information associated with newly identified items. The annotations can be created by a server or by a mobile device. Placement information on where the annotations are to be positioned on a display screen are determined. The annotations are displayed on the display screen according to the placement information. In some implementations, the position of annotations on a display screen corresponds to the geographic relationship between the location of the client device and locations associated with the annotations. After results are displayed, a change in position or a change in clipping value may occur, causing stages 502 or 504 to occur.

At stage 512, a selection of a result is received. For example, referring to FIG. 1, a user of the mobile device 102 selects the annotation 108 by pressing on the display screen 103 with a stylus or a finger. As another example, the user selects the annotation 110 using a track ball or input keys of the mobile device 102. In some implementations, an indication of the selection is sent from a client device to a server.

At stage 514 action is taken on the selected result. For example, a server may receive an indication of the selection and return a landing page associated with the selected annotation. As another example, when a user selects an annotation, the client device displays a map indicating a route for getting from the current location of the client device to the location associated with the annotation. As another example, the client device may initiate a call, e-mail, or text message to a business or individual associated with an annotation. As yet another example, a user may select an icon in order to cause the client device to switch between a map view, a three dimensional landscape view, and an augmented reality view. Upon taking the action, the results of the action are displayed at stage 510.

Figure 6:
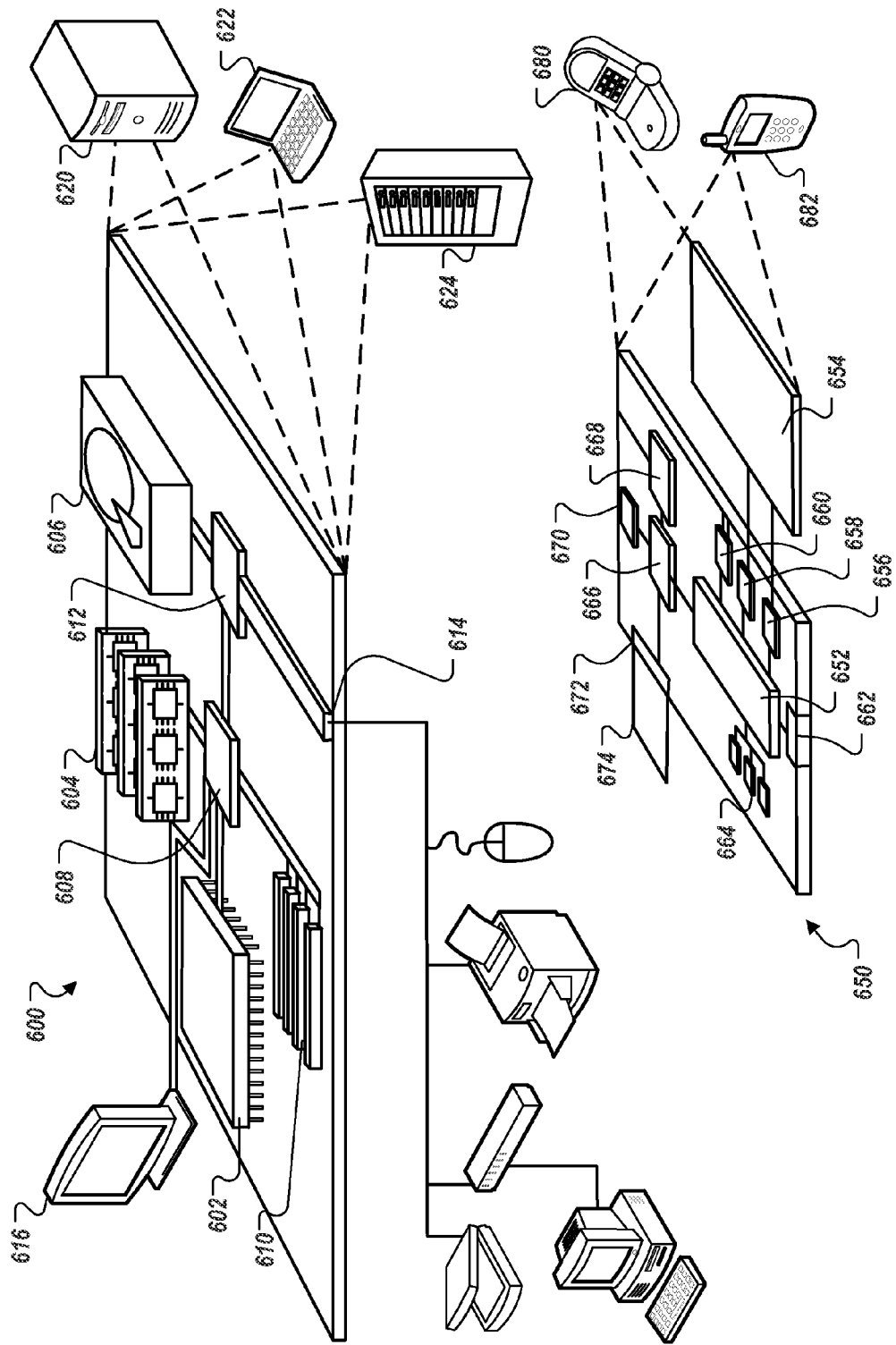
FIG. 6 is a block diagram of computing devices that may be used to implement the systems and methods described in this document, as either a client or as a server or plurality of servers.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally computing device 600 or 650 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652 that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Figure 7:
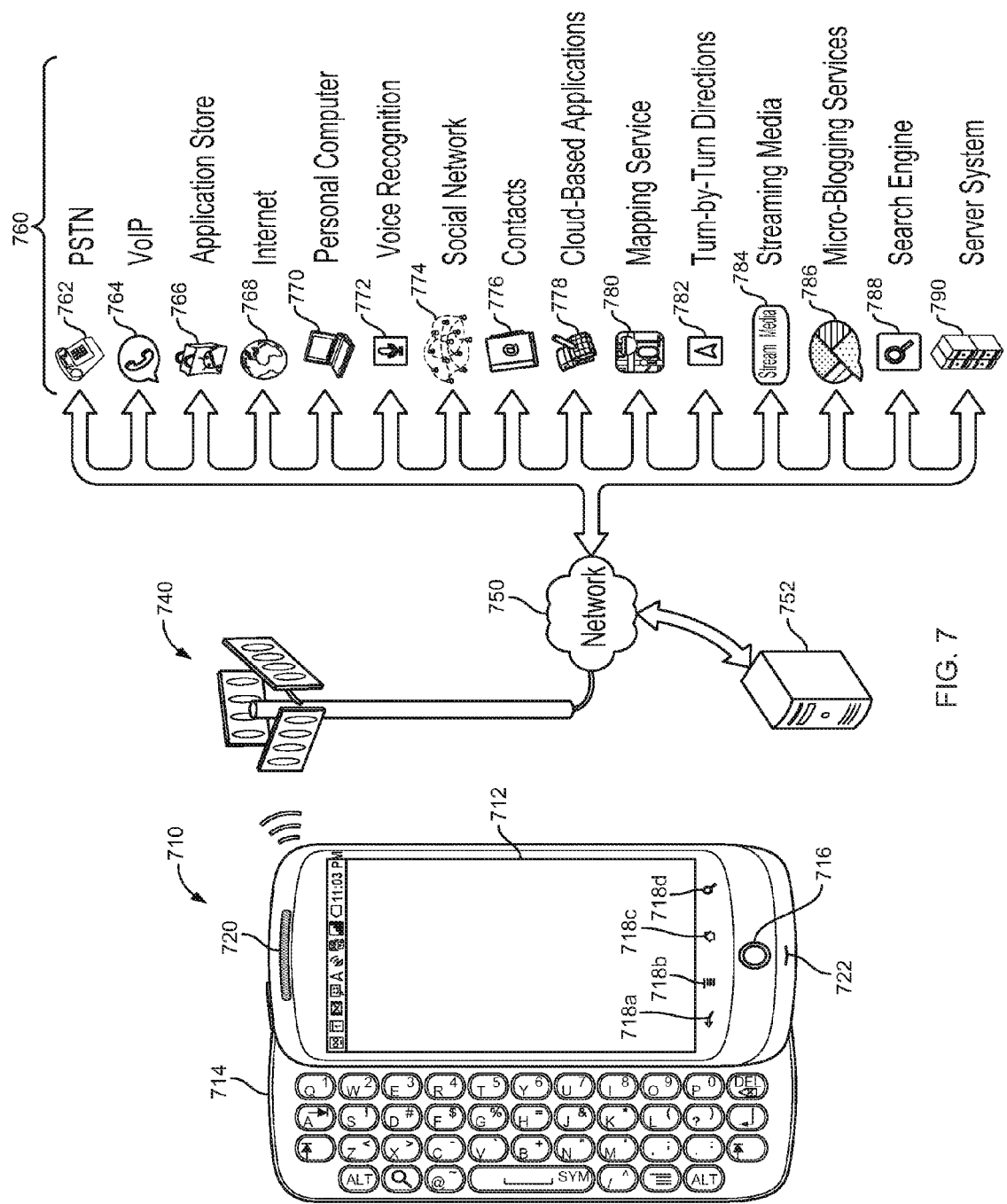
FIG. 7 is a conceptual diagram of a system that may be used to implement the systems and methods described in this document.

Referring now to FIG. 7, a conceptual diagram of a system that may be used to implement the systems and methods described in this document is illustrated. In the system, mobile computing device 710 can wirelessly communicate with base station 740, which can provide the mobile computing device wireless access to numerous hosted services 760 through a network 750.

In this illustration, the mobile computing device 710 is depicted as a handheld mobile telephone (e.g., a smartphone, or application telephone) that includes a touchscreen display device 712 for presenting content to a user of the mobile computing device 710 and receiving touch-based user inputs. Other visual, auditory, and tactile output components may also be provided (e.g., LED lights, a speaker for providing tonal, voice-generated, or recorded output, or vibrating mechanisms for tactile output), as may various different input components (e.g., keyboard 714, physical buttons, trackballs, accelerometers, gyroscopes, and magnetometers).

Example visual output mechanism in the form of display device 712 may take the form of a 3.7 or 4.3 inch LED or AMOLED display with resistive or capacitive touch capabilities, for displaying video, graphics, images, and text, and coordinating user touch inputs locationally with the displayed information so that user contact above a displayed item may be associated with the item by the device 710. The mobile computing device 710 may take alternative forms also, including as a laptop computer, a tablet or slate computer, a personal digital assistant, an embedded system (e.g., a car navigation system), a desktop personal computer, or a computerized workstation.

An example mechanism for receiving user-input includes keyboard 714, which may be a full qwerty keyboard or a traditional keypad that includes keys for the digits '0-9', '*', and '#.' The keyboard 714 receives input when a user physically contacts or depresses a keyboard key. User manipulation of a trackball 716 or interaction with a trackpad enables the user to supply directional and rate of rotation information to the mobile computing device 710 (e.g., to manipulate a position of a cursor on the display device 712).

The mobile computing device 710 may be able to determine a position of physical contact with the touchscreen display device 712 (e.g., a position of contact by a finger or a stylus). Using the touchscreen 712, various "virtual" input mechanisms may be produced, where a user interacts with a graphical user interface element depicted on the touchscreen 712 by contacting the graphical user interface element. An example of a "virtual" input mechanism is a "software keyboard," where a keyboard is displayed on the touchscreen and a user selects keys by pressing a region of the touchscreen 712 that corresponds to each key.

The mobile computing device 710 may include mechanical or touch sensitive buttons 718a-d. Additionally, the mobile computing device may include buttons for adjusting volume output by the one or more speakers 720, and a button for turning the mobile computing device on or off. A microphone 722 allows the mobile computing device 710 to convert audible sounds into an electrical signal that may be digitally encoded and stored in computer-readable memory, or transmitted to another computing device. The mobile computing device 710 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 710 may present a graphical user interface with the touchscreen 712. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 704. User-selection of the button may invoke the pre-defined action.

In some examples, the operating system provides a "desktop" user interface that is displayed upon turning on the mobile computing device 710, activating the mobile computing device 710 from a sleep state, upon "unlocking" the mobile computing device 710, or upon receiving user-selection of the "home" button 718c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 710 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 712 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 710 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 710 may include other application modules and hardware. A call handling unit may receive an indication of an incoming telephone call and provide a user capabilities to answer the incoming telephone call. A media player may allow a user to listen to music or play movies that are stored in local memory of the mobile computing device 710. The mobile telephone 710 may include a digital camera sensor, and corresponding image and video capture and editing software. An internet browser may enable the user to view content from a web page by typing in an addresses corresponding to the web page or selecting a link to the web page.

The mobile computing device 710 may include an antenna to wirelessly communicate information with the base station 740. The base station 740 may be one of many base stations in a collection of base stations (e.g., a mobile telephone cellular network) that enables the mobile computing device 710 to maintain communication with a network 750 as the mobile computing device is geographically moved. The computing device 710 may alternatively or additionally communicate with the network 750 through a Wi-Fi router or a wired connection (e.g., Ethernet, USB, or FIREWIRE). The computing device 710 may also wirelessly communicate with other computing devices using BLUETOOTH protocols, or may employ an ad-hoc wireless network.

A service provider that operates the network of base stations may connect the mobile computing device 710 to the network 750 to enable communication between the mobile computing device 710 and other computerized devices that provide services 760. Although the services 760 may be provided over different networks (e.g., the service provider's internal network, the Public Switched Telephone Network, and the Internet), network 750 is illustrated as a single network. The service provider may operate a server system 752 that routes information packets and voice data between the mobile computing device 710 and computing devices associated with the services 760.

The network 750 may connect the mobile computing device 710 to the Public Switched Telephone Network (PSTN) 762 in order to establish voice or fax communication between the mobile computing device 710 and another computing device. For example, the service provider server system 752 may receive an indication from the PSTN 762 of an incoming call for the mobile computing device 710. Conversely, the mobile computing device 710 may send a communication to the service provider server system 752 initiating a telephone call with a telephone number that is associated with a device accessible through the PSTN 762.

The network 750 may connect the mobile computing device 710 with a Voice over Internet Protocol (VoIP) service 764 that routes voice communications over an IP network, as opposed to the PSTN. For example, a user of the mobile computing device 710 may invoke a VoIP application and initiate a call using the program. The service provider server system 752 may forward voice data from the call to a VoIP service, which may route the call over the internet to a corresponding computing device, potentially using the PSTN for a final leg of the connection.

An application store 766 may provide a user of the mobile computing device 710 the ability to browse a list of remotely stored application programs that the user may download over the network 750 and install on the mobile computing device 710. The application store 766 may serve as a repository of applications developed by third-party application developers. An application program that is installed on the mobile computing device 710 may be able to communicate over the network 750 with server systems that are designated for the application program. For example, a VoIP application program may be downloaded from the Application Store 766, enabling the user to communicate with the VoIP service 764.

The mobile computing device 710 may access content on the internet 768 through network 750. For example, a user of the mobile computing device 710 may invoke a web browser application that requests data from remote computing devices that are accessible at designated universal resource locations. In various examples, some of the services 760 are accessible over the internet.

The mobile computing device may communicate with a personal computer 770. For example, the personal computer 770 may be the home computer for a user of the mobile computing device 710. Thus, the user may be able to stream media from his personal computer 770. The user may also view the file structure of his personal computer 770, and transmit selected documents between the computerized devices.

A voice recognition service 772 may receive voice communication data recorded with the mobile computing device's microphone 722, and translate the voice communication into corresponding textual data. In some examples, the translated text is provided to a search engine as a web query, and responsive search engine search results are transmitted to the mobile computing device 710.

The mobile computing device 710 may communicate with a social network 774. The social network may include numerous members, some of which have agreed to be related as acquaintances. Application programs on the mobile computing device 710 may access the social network 774 to retrieve information based on the acquaintances of the user of the mobile computing device. For example, an "address book" application program may retrieve telephone numbers for the user's acquaintances. In various examples, content may be delivered to the mobile computing device 710 based on social network distances from the user to other members. For example, advertisement and news article content may be selected for the user based on a level of interaction with such content by members that are "close" to the user (e.g., members that are "friends" or "friends of friends").

The mobile computing device 710 may access a personal set of contacts 776 through network 750. Each contact may identify an individual and include information about that individual (e.g., a phone number, an email address, and a birthday). Because the set of contacts is hosted remotely to the mobile computing device 710, the user may access and maintain the contacts 776 across several devices as a common set of contacts.

The mobile computing device 710 may access cloud-based application programs 778. Cloud-computing provides application programs (e.g., a word processor or an email program) that are hosted remotely from the mobile computing device 710, and may be accessed by the device 710 using a web browser or a dedicated program. Example cloud-based application programs include GOOGLE DOCS word processor and spreadsheet service, GOOGLE GMAIL webmail service, and PICASA picture manager.

Mapping service 780 can provide the mobile computing device 710 with street maps, route planning information, and satellite images. An example mapping service is GOOGLE MAPS. The mapping service 780 may also receive queries and return location-specific results. For example, the mobile computing device 710 may send an estimated location of the mobile computing device and a user-entered query for "pizza places" to the mapping service 780. The mapping service 780 may return a street map with "markers" superimposed on the map that identify geographical locations of nearby "pizza places."

Turn-by-turn service 782 may provide the mobile computing device 710 with turn-by-turn directions to a user-supplied destination. For example, the turn-by-turn service 782 may stream to device 710 a street-level view of an estimated location of the device, along with data for providing audio commands and superimposing arrows that direct a user of the device 710 to the destination.

Various forms of streaming media 784 may be requested by the mobile computing device 710. For example, computing device 710 may request a stream for a pre-recorded video file, a live television program, or a live radio program. Example services that provide streaming media include YOUTUBE and PANDORA.

A micro-blogging service 786 may receive from the mobile computing device 710 a user-input post that does not identify recipients of the post. The micro-blogging service 786 may disseminate the post to other members of the micro-blogging service 786 that agreed to subscribe to the user.

A search engine 788 may receive user-entered textual or verbal queries from the mobile computing device 710, determine a set of internet-accessible documents that are responsive to the query, and provide to the device 710 information to display a list of search results for the responsive documents. In examples where a verbal query is received, the voice recognition service 772 may translate the received audio into a textual query that is sent to the search engine.

These and other services may be implemented in a server system 790. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method, comprising:
receiving, by a computing system, a search query that was entered at a mobile computing device;
identifying, by the computing system, a first set of one or more items that are search results responsive to the received search query and that are located within a first geographic zone, the first geographic zone extending radially outward a first geographic distance from a base geographic point at which the mobile computing device is located;
identifying, by the computing system, a second set of one or more items that are search results responsive to the received search query and that are located within a second geographic zone, the second geographic zone beginning at the first geographic distance and extending radially outward a second geographic distance from the base geographic point at which the mobile computing device is located, the second geographic distance being greater than the first geographic distance;
identifying, by the computing system, a third set of one or more items that are responsive to the search query and that are located within a third geographic zone, the third geographic zone beginning at the second geographic distance and extending radially outward from the base geographic point at which the mobile computing device is located;
providing, by the computing system and for receipt by the mobile computing device in response to receiving the search query, data for causing the mobile computing device to display a first set of one or more labels that correspond to the first set of one or more items, each of the labels in the first set of labels corresponding to a respective geographical feature that is located within the first zone; and
providing, by the computing system and for receipt by the mobile computing device in response to receiving the search query, data causing the mobile computing device to store information regarding the second set of one or more items but not to display a second set of one or more labels that correspond to the second set of one or more items while each item within the second set of one or more items is within the second zone,
wherein the computing system identifies the third set of one or more items without providing data for causing the mobile computing device to store information regarding the third set of one or more items or display a third set of one or more labels that correspond to the third set of one or more items, while each item within the third set of one or more items is within the third zone.

2. The method of claim 1, wherein the first geographic distance is defined by a user input to the mobile computing device.

3. The method of claim 1, further comprising receiving, at the computing system, a field of view defined by a compass on the mobile computing device, and wherein the first zone is a portion of an area extending radially outward a first geographic distance from a base point at which the mobile computing device is located that is within the field of view received from the mobile computing device, and wherein second zone begins at the first geographic distance and extends radially outward a second geographic distance from the base point at which the mobile computing device is located and also is a portion of an area extending radially outward a first geographic distance from a base point at which the mobile computing device is located that is outside the field of view received from the mobile computing device, wherein the second geographic distance is greater than the first geographic distance.

4. The method of claim 3, wherein the field of view represents a direction in which a camera on the mobile computing device is pointed.

5. The method of claim 1, further comprising generating data that defines a location for display of each label of the first set of labels on the display, wherein the location corresponds to a distance of a particular geographical feature that corresponds to a particular label from the base geographic point.

6. The method of claim 1, wherein the data for causing the mobile computing device to display the identified first set of one or more items represents locations on the display for displaying labels from the first set of labels, the locations being selected to correspond to distances from the base point to geographical locations represented by the first set of labels.

7. The method of claim 1, further comprising receiving an indication that the user has selected a label that corresponds to a first one of the first set of one or more items, and, in response, generating a search query that includes at least one term representative of the first one of the selected items, and displaying search results that are responsive to the search query.

8. The method of claim 1, wherein
a central server system provides to the mobile computing device, in response to a request that identifies a geographic location of the mobile computing device, data for representing labels in an area that surrounds the base geographic point, and
the mobile computing device selects certain ones of the first set of labels to display, from the previously provided data from the central server system, in response to the user changing a direction in which the mobile computing device is pointed, and wherein
different selected labels are displayed on the mobile computing device based on current orientations of the mobile computing device without obtaining additional labels from the central server system.

9. The method of claim 1, further comprising receiving a touch input on a label, and in response to receiving the touch input, causing a telephone call to be made by the mobile computing device to a telephone number that is determined to be associated with a geographical feature corresponding to the label.

10. The method of claim 1, further comprising changing a presentation on the display of the mobile computing device from an augmented reality presentation to a map presentation in response to identifying a user input of a specified motion to the mobile computing device.

11. The method of claim 1, further comprising displaying labels for one or more items from the second set of one or more items based on the stored information regarding the second set of one or more items when the base geographic point where the mobile computing device is located moves in a direction of one or more geographic features that correspond to the one or more items from the second set of one or more items.

12. A tangible, non-transitory recordable medium having recorded thereon instructions, that when executed, perform actions comprising:
receiving, by a computing system, a search query that was entered at a mobile computing device;
identifying, by the computing system, a first set of one or more items that are search results responsive to the received search query and that are located within a first geographic zone, the first geographic zone extending radially outward a first geographic distance from a base geographic point at which the mobile computing device is located;
identifying, by the computing system, a second set of one or more items that are search results responsive to the received search query and that are located within a second geographic zone, the second geographic zone beginning at the first geographic distance and extending radially outward a second geographic distance from the base geographic point at which the mobile computing device is located, the second geographic distance being greater than the first geographic distance;
identifying, by the computing system, a third set of one or more items that are responsive to the search query and that are located within a third geographic zone, the third geographic zone beginning at the second geographic distance and extending radially outward from the base geographic point at which the mobile computing device is located;
providing, by the computing system and for receipt by the mobile computing device in response to receiving the search query, data for causing the mobile computing device to display a first set of one or more labels that correspond to the first set of one or more items of the labels in the first set of labels corresponding to a respective geographical feature that is located within the first zone; and
providing, by the computing system and for receipt by the mobile computing device in response to receiving the search query, data causing the mobile computing device to store information regarding the second set of one or more items but not to display a second set of one or more labels that correspond to the second set of one or more items while each item within the second set of one or more items is within the second zone,
wherein the computing system identifies the third set of one or more items without providing data for causing the mobile computing device to store information regarding the third set of one or more items or display a third set of one or more labels that correspond to the third set of one or more items, while each item within the third set of one or more items is within the third zone.

13. The tangible, non-transitory recordable medium of claim 12, wherein the first geographic distance is defined by a user input to the mobile computing device.

14. The tangible, non-transitory recordable medium of claim 12, wherein the actions further comprise receiving, at the computing system, a field of view defined by a compass on the mobile computing device, and
wherein the first zone is a portion of an area extending radially outward a first geographic distance from a base point at which the mobile computing device is located that is within the field of view received from the mobile computing device, and wherein second zone begins at the first geographic distance and extends radially outward a second geographic distance from the base point at which the mobile computing device is located and also is a portion of an area extending radially outward a first geographic distance from a base point at which the mobile computing device is located that is outside the field of view received from the mobile computing device, wherein the second geographic distance is greater than the first geographic distance.

15. The tangible, non-transitory recordable medium of claim 14, wherein the field of view represents a direction in which a camera on the mobile computing device is pointed.

16. A computer-implemented augmented reality system, comprising:
   an interface programmed to receive user input that defines a search query;
   a computer database that stores descriptive items that represent geographical features that are correlated to geographical locations;
   a filter to select from the descriptive items:
      a first set of one or more items that are search results responsive to the received search query and that are located within a first geographic zone, the first geographic zone extending radially outward a first geographic distance from a base geographic point at which the mobile computing device is located,
      a second set of one or more items that are search results responsive to the received search query and that are located within a second geographic zone, the second geographic zone beginning at the first geographic distance and extending radially outward a second geographic distance from the base geographic point at which the mobile computing device is located, the second geographic distance being greater than the first geographic distance, and
      a third set of one or more items that are responsive to the search query and that are located within a third geographic zone, the third geographic zone beginning at the second geographic distance and extending radially outward from the base geographic point at which the mobile computing device is located;
   a storage medium to store information regarding the second set of one or more items but not to display a second set of one or more labels that correspond to the second set of one or more items while each item within the second set of one or more items is within the second zone; and
   an augmented reality application on the mobile computing device programmed to display a first set of one or more labels that correspond to the first set of one or more items of the labels in the first set of labels corresponding to a respective geographical feature that is located within the first zone,
   wherein the filter selects the third set of one or more items without providing data for causing the storage medium to store information regarding the third set of one or more items or the augmented reality application to display a third set of one or more labels that correspond to the third set of one or more items, while each item within the third set of one or more items is within the third zone.

17. The system of claim 16, wherein the interface receives a user input indicating the first geographic distance.

18. The system of claim 16, further comprising a compass, and wherein the augmented reality application is programmed receive a field of view defined by the compass, and wherein the first zone is a portion of an area extending radially outward a first geographic distance from a base point at which the mobile computing device is located that is within the field of view received from the mobile computing device, and wherein second zone begins at the first geographic distance and extends radially outward a second geographic distance from the base point at which the mobile computing device is located and also is a portion of an area extending radially outward a first geographic distance from a base point at which the mobile computing device is located that is outside the field of view received from the mobile computing device, wherein the second geographic distance is greater than the first geographic distance.

19. The system of claim 16, wherein the augmented reality application is programmed to position the labels on a display according to a distance of each item that corresponds to a label from the base geographic point.

20. The system of claim 16, wherein the augmented reality application is located on the mobile computing device, and the filter is located on a server system that is remote from the mobile computing device.

21. The system of claim 20, wherein the server system is programmed to provide data for representing labels for geographic features in a zone surrounding the mobile computing device, and the augmented reality application is programmed to select a sub-set of items within the zone, in a direction that the user is facing in the augmented reality application.

22. A computer-implemented system, comprising:
   an interface programmed to receive user input that defines a search query;
   a computer database that stores descriptive items that represent geographical features that are correlated to geographical locations;
   means for identifying:
      a first set of one or more items that are search results responsive to the received search query and that are located within a first geographic zone, the first geographic zone extending radially outward a first geographic distance from a base geographic point at which the mobile computing device is located,
      a second set of one or more items that are search results responsive to the received search query and that are located within a second geographic zone, the second geographic zone beginning at the first geographic distance and extending radially outward a second geographic distance from the base geographic point at which the mobile computing device is located, the second geographic distance being greater than the first geographic distance, and
      a third set of one or more items that are responsive to the search query and that are located within a third geographic zone, the third geographic zone beginning at the second geographic distance and extending radially outward from the base geographic point at which the mobile computing device is located;
   a storage medium to store information regarding the second set of one or more items but not to display a second set of one or more labels that correspond to the second set of one or more items while each item within the second set of one or more items is within the second zone;
   a display arranged to present a first set of one or more labels that correspond to the first set of one or more items of the labels in the first set of labels corresponding to a respective geographical feature that is located within the first zone, wherein the means for identifying identifies the third set of one or more items without providing data for causing the storage medium to store information regarding the third set of one or more items or the display to display a third set of one or more labels that correspond to the third set of one or more items, while each item within the third set of one or more items is within the third zone.

23. The system of claim 22, further comprising means for selecting, from the one or more of the labels of the first set of items, items that are located in a direction from a user in a virtual space of an augmented reality application that corresponds to a direction that the user is facing in the virtual space and that are within the first geographic distance from the user.

24. The method of claim 22, wherein the display is programmed to position the labels on the display according to a distance of each item that correspond to a label from the base geographic point.

\* \* \* \* \*

UNITED STATES PATENT AND TRADEMARK OFFICE
CERTIFICATE OF CORRECTION

PATENT NO. : 8,698,843 B2  
APPLICATION NO. : 12/938029  
DATED : April 15, 2014  
INVENTOR(S) : Erick Tseng Page 1 of 1

It is certified that error appears in the above-identified patent and that said Letters Patent is hereby corrected as shown below:

In the Claims:

Column 33, line 67, Claim 18, after "programmed" please insert -- to --; and

Column 45, line 17, Claim 24, please delete "method" and insert therefor -- system --.

Signed and Sealed this  
Fifteenth Day of July, 2014

Michelle K. Lee  
*Deputy Director of the United States Patent and Trademark Office*